United States Patent [19]

Schröder

[11] Patent Number: 5,265,205
[45] Date of Patent: Nov. 23, 1993

[54] OFFICE COMMUNICATION SYSTEM

[75] Inventor: Günter Schröder, Oberasbach, Fed. Rep. of Germany

[73] Assignee: Grundig E.M.V., Fuerth/Bay, Fed. Rep. of Germany

[21] Appl. No.: 547,932

[22] Filed: Jul. 3, 1990

[30] Foreign Application Priority Data

Jul. 4, 1989 [DE] Fed. Rep. of Germany ....... 3921943

[51] Int. Cl.$^5$ .............................. G06F 13/00
[52] U.S. Cl. .................................. 395/200
[58] Field of Search ............... 395/200, 275; 364/145, 364/251.4, 236.1, 236.2, 189, 234.3

[56] References Cited

U.S. PATENT DOCUMENTS 4,779,224 10/1988 Moseley et al. .................... 395/200

Primary Examiner—Robert L. Richardson
Assistant Examiner—Moustafa Meky
Attorney, Agent, or Firm—Kane, Dalsimer, Sullivan, Kurucz, Levy, Eisele and Richard

[57] ABSTRACT

An office communication system for transmitting data and/or video information through a communication network to a given device and at a given point in time. An automatic selection device is provided having a timer circuit with a calendar function which may be adjusted by the user along with control device. The automatic selecting device makes a connection through the communication network corresponding to the time desired by the user. A data transmission occurs through a communication interface means at a time which is cost favorable to the user.

4 Claims, 1 Drawing Sheet

OFFICE COMMUNICATION SYSTEM

FIELD OF THE INVENTION

The invention relates to an office communication system for the transmission of data through a communication network.

BACKGROUND OF THE INVENTION

In all areas of the economy, in particular in the office area, data in text and more recently video is received, processed, classified and often retransmitted. The continuing development of the technology in this area has the resulting effect that office communication systems have become more and more voluminous and overtaxed.

With multilocation systems and their connection in private, local and public communication networks, the communication process to exchange information by necessity becomes more and more complicated. In addition, network communications which provide for the paperless transfer of data, documents or other information may have the same or different text processing systems, filing systems and computers etc., all of which may involve different communication networks. For example, with network connections the office communication systems may be coupled to data processing equipment and in addition allow the tying in of an integrated digital network (IDN) or a integrated service digital network (ISDN).

Modern office communication systems can assist and facilitate the user in job performance but require specific knowledge of the system involved and considerable experience regarding its use. This is particularly true for the constantly growing communication tasks in the office and in the administration of the variety of functions provided.

With this in mind, certain systems and devices for data handling will be briefly discussed. A device for remote controlled switching on and off of electrical units, particularly computer equipment is disclosed in DE-PS 29 51 550. In this regard, a central station is coupled through a standard interface transmission control device, a modem and a standard-telecommunication line and/or standard-data line to remote stations for a remote data transmission. In operation a connection is made with the modem by way of an automatic selecting device of the central computer. When the connection is completed and after an acknowledgement signal has been received from the modem of the remote station in the central station, digital control signals are sent from the central computer to a remote controlled switching device which is provided in the remote station. The central station generates and transmits a self identifying coded communication identifying the particular switching device which it wants switched on. To determine the availability of the remote station, it must signal the center computer that it is available to receive the transmission. A timer is provided between the remote station and central station and if the availability cannot be determined within a certain predetermined span of time, the central computer terminates the connection. For this purpose, the remote station is provided with a programmable read-only memory which generates a predetermined signal sequence (message). The central computer compares the coded signal sequence with the one stored in its memory. For example, if within the predetermined time interval, for example 100 ms, confirmation of the coded signal is made, the power supply device of the remote station is signaled to turn on.

With the use of such a device it is possible to transmit data at any time. However, data transmission is particularly advantageous at night or on weekends or at any other time when the traffic load on the communication networks is not too high and the fees involved for their use are relatively low. Furthermore, the computer equipment, is only switched on when a data transfer can occur.

In DE-OS 37 21 047, a communication control method is disclosed which involves connecting through the public telephone network a calling station and a called station. Once this is done, the next step involves selecting a transmission mode so as to enable a transmission of messages between telephones, teletex devices, personal computers, facsimile or similar devices. A communication transmitting device is provided and includes, among other things, a system control unit which controls the total operation of the communication transmission device. This control unit processes different communication and transmission functions and different data processing operations. A coder/decoder is also provided which performs a data concentration or expansion. The device is further provided with a communication control unit which can perform the communication-processing steps in different communication modes, for example, for facsimile, teletex or PC-communication. A modem serves to modulate the signal transmitted and demodulate a received signal for processing and/or analog-digital or digital-analog conversion. In addition, the modem can be operated in different modes which may be required for the various transmission functions.

A processing system with a number of peripheral input locations for dictation is set forth in DE-PS 21 59 848. This system involves input locations which are connected to a central office for a dictation transmission. In the central office, the recorded dictations are monitored and converted into the written text. In order to identify the dictations which come from different dictation input locations or to identify the different dictation segments coming from the same dictation input location, each dictation input location is provided with an answer-back unit which marks each dictation segment with an identification code. In the central office, the sorting and combining of the individual text segments into a complete text is then performed in light of the identification assigned to each individual text segment. In order to enable an immediate checking of the dictation after it is transcribed into text, each dictation input location is provided with a display screen which permits a visual display of the text segments which are stored in memory. The message transmission of the dictation and text between the input locations and the central office is performed by a private communication network.

With the different office communication systems and text processing systems, it is possible at any given point in time to build up a communication network. However, these systems are normally adapted specifically for the particular requirements of the users. In addition, the required control devices are normally very expensive and do not offer high user comfort. Furthermore, the remote data transmission must often be initiated, monitored and controlled by an operator.

SUMMARY OF INVENTION

It is therefore a principle object of the invention to design an office communication system and/or text processing system in such a manner that the user can make use of it without having a special knowledge of the various technology and systems involved. Such a situation would exist where the different functions and the required control commands are either known to the user or are processed automatically, as for example, when automatically generated by a microprocessor.

It is a further object of the invention to design an office communication system such that the transmission of stored information, for example, data or video information is made possible at any given point in time and to any given location.

The present invention in this regard provides an office communication system wherein different functions and input commands are known to the user so that the communication process is simplified and manageable for the user. The communication system also allows stored messages to be automatically and rapidly processed as is necessary at a reduced cost. The foregoing is achieved by utilizing commands for data transmission which are similar to those used in video recorders or perhaps telephones with automatic dialing devices. In such a situation despite the multitude of functions that may be involved through such commands, the user will be comfortable with their use and encouraged to use such a system.

In this regard, for example for data transmission having low transmission speeds, e.g. 300 bauds, any given device in the office may be used, namely the telephone. The data is converted by, for example, an acoustic-coupler into acoustic signals and transmitted through the public telephone network to the desired location which may also have an acoustic-coupler or a modem. The connection may be controlled by an automatic dialing device or a modem answering machine.

The present system provides a comprehensive and multitude of application possibilities in all areas of business, industry, technology, commerce, service, government agencies and administration. It enables the transmission of the internal and/or external correspondence as well as the transmission of a high volume of documents and data. Such data may involve text and document processing which may contain, for example, text, graphic, tables, free hand drawings and pictures. This data can be scanned with a scanner, processed and recorded in a mass memory for storing. The administration of the mass memory can be organized as a central as well as a decentral filing structure.

The present system offers a multitude of extension and expansion possibilities. Through interface devices which, for example, have a high speed-series interface, a V.24-interface, and X.21-interface, access to numerous and differently designed office devices or their memory is possible. Such office devices are data processing systems with a floppy disk, optical storage plate or a stationary plate; printer; plotter; cassette recorder; streamer; computers; word processors; or desk top publishing systems.

The present system also enables an economical design of a communication network by using a video recorder which requires no specific knowledge by the user of the communication process network technology. The method for programming the time displaced information exchange is performed in the same manner as the programming of a video recorder to receive and/or recording defined transmissions. To facilitate programming, the numbers to be called and the time of transmission which are in memory may be indicated on a display.

For the cross linking of different data processing and office systems, access to the information stored in memory are considered during transmission in addition to the compatibility of the different networks. A simple access and the checking of the access authorization is provided.

BRIEF DESCRIPTION OF THE DRAWING

Thus by the present invention, its objects and advantages will be realized, the description of which should be taken in conjunction with the drawing, wherein.

DETAILED DESCRIPTION OF THE PREFERRED EMBODIMENT

Figure 1:
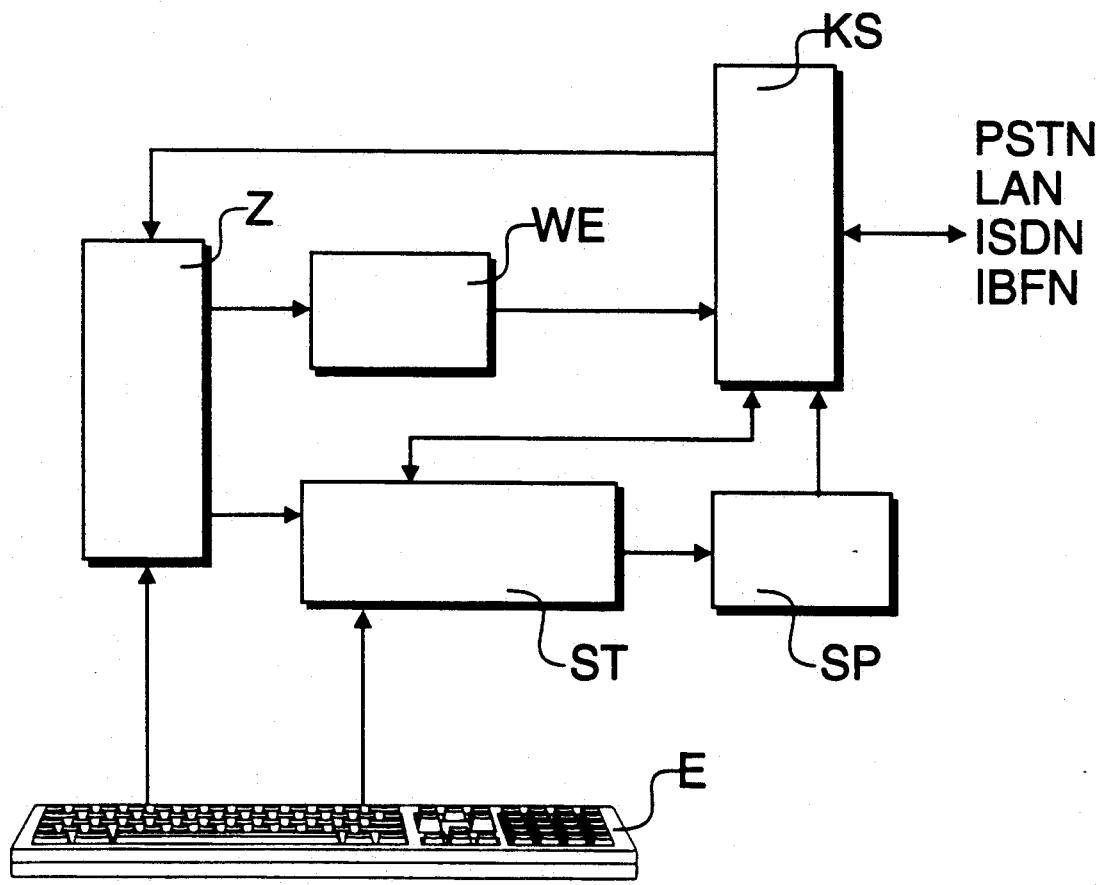
FIG. 1 is a schematic representation of the system incorporating the teachings of the present invention.

Turning now more particularly to the drawing, a filing system incorporating the teachings of the present invention is illustrated by way of example. It should be understood however that such a system may be implemented in a text processing system, computer, desk top publishing system etc., which are provided with a sufficient memory suitable for the purpose. In this regard, a device for storing and recovering of video information is disclosed in for example German patent application P 39 07 487. In such a device, video information is stored in a data bank and retrieved as desired. The device contains a control device (ST) having a program memory, a scanning device (scanner), a mass memory SP, a display unit, a printer as well as an input means or keyboard E. Some of these elements used in the present system are illustrated in the drawing.

Documents scanned may be stored sequentially in a mass memory SP. The memory capacity of the magnetic tape used in this example may be about 1.200 A4 pages per hour running time with a resolution of 200 dpi. A listing of the content of the documents stored on the magnetic tape is also stored. The display device shown fulfills two tasks: first it displays the document; and second it provides a display of the menu of categorized documents, reports, and the menus of items to assist the user.

The user inputs commands by means of the keyboard E which are processed by the control device ST. This results in the individual devices to perform the desired function. For example, if the user inputs a "recording" command by the keyboard E, this function of "recording" is then performed by way of the control device ST and the scanning device. In a corresponding manner the function of "storing" is performed by means of the control device ST and mass memory SP. The function of "seek" is performed by means of the seek information memory and control device ST. The function of "show" is performed by means of the control device ST and the display device and the function of "print" is performed by means of the control device ST and the printer.

A further task of the control device ST is to recover video information from a microfilm and/or microfiche data bank. The seek information sought is contained in a common "seek" information memory for the corresponding data on the magnetic tape or the microfilm and/or the microfiche data. When entering the documents in the microfilm or microfiche data, the user determines the seek terms for the video information displayed on the display device which together with the associated address (for example, X-Y coordinates in the microfiche) are read into the seek information memory.

In the office communication system, an additional automatic selecting device WE, a time switching device Z with a calendar function, and a communication interface device KS are provided for the transmission of communication and/or video information through the communication network. The system generates a control signal at a defined point in time which triggers the automatic selecting device WE for making a connection through the communication network. When the connection is made, the control device ST controls the read out of the stored communication and/or video information from the mass memory SP. The transmission of communication and/or video information is performed through the communication network via the communication interface device KS which is connected with the mass memory SP. If the information exchange is performed using the standard ISDN, one can select connections of group 1 as well as other fixed connections of groups 2 and 3 through the communication interface device KS. The communication interface device KS may have base and primary multiplex connections, whereby for all services a unitary number is generally provided.

In the selective connections of group 1, i.e., line exchange, analog and digital connections through telephone or other type connections (ISDN), the traffic fees or use dependent fees are determined in accordance with the duration of the connection, time of day, weekday and tariff zone. In the ISDN, the combination of a plurality of services or types of communications is possible. An example for such a mixed communication, the text and video transmission with a Bit rate of 64 kbit/s or the language and video transmission with a Bit-rate of 2×64 kbit/s are provided. An example in this regard would be where text and video transmission are the combination of teletex and telefax which enables the original transmission of documents in video and in written form. An example for the type of communication involving language and video transmission is the video telephone wherein the spoken word is simultaneous with the transmission of the video.

The present system can advantageously be designed taking into consideration the network architecture based on the OSI-Standard. It is adaptable in a simple manner to connect into a wide band network such as IBFN, having for example, a bit rate of 140 Mbit/s.

The storing of data and/or the video information may be performed in the present system by a video recorder. During the storing of data and/or video information, the control device ST also applies an identification code to identify the video recorder, in addition to the seek information. This identification is automatically transmitted during the information exchange so that the origin of the received information may be made. Communication transmissions through PSTN can be performed corresponding to that of telefax service.

The information exchange can also be initiated from a remote device whereby the communication interface device KS is connected with the time switching device Z. The control device ST checks whether the calling device is authorized to access the data and/or video information which is stored in the mass memory SP based on received identification signals. Only then does it cause the control device ST to read out information contained in mass memory SP.

Thus by the present invention, its objects and advantages are realized, and although a preferred embodiment has been disclosed and described in detail herein, its scope should not be limited thereby rather its scope should be determined by that of the appended claims.

I claim:

1. A system for the transmission of data through a communication network, comprising:
   mass memory means for storing the data;
   at least one communication interface means for remote data transfer in communication with said mass memory means;
   an automatic dialing device or an answering machine in communication with said communication interface means;
   time switching means coupled to said automatic dialing device or answering machine having an adjustable calendar function for generating a control signal at a predetermined time which results in said automatic dialing device or answering machine making a connection through the communication network via said communication interface means with an end user device;
   an input means for setting the time switching means;
   a control device coupled to said time switching means and said input means for transmission of data contained in said mass memory means; and
   a video recorder means communicating with said automatic dialing device or answering machine, said control device controlling said time switching means and storage of data in said mass memory means.

2. The system in accordance with claim 1, wherein the control device during data storage operations applies location and identification information which is transmitted during data exchange.

3. The system in accordance with claim 2, wherein said control device determines if the end user device is authorized to access information stored in said mass memory means based upon the identification data transmitted.

4. A system for the transmission of data through a communication network, comprising:
   mass memory means for storing the data;
   at least one communication interface means for remote data transfer in communication with said mass memory means;
   an automatic dialing device or an answering machine in communication with said communication interface means;
   time switching means coupled to said automatic dialing device or answering machine having an adjustable calendar function for generating a control signal at a predetermined time which results in said automatic dialing device or answering machine making a connection through the communication network via said communication interface means with an end user device;
   an input means for setting the time switching means;
   a control device coupled to said time switching means and said input means for transmission of data contained in said mass memory means; and
   wherein the communication interface means sends data to said time switching means and said time switching means generates a control signal for activating said control device.

* * * * *